(12) United States Patent
Alisafaee et al.

(10) Patent No.: US 9,791,618 B2
(45) Date of Patent: Oct. 17, 2017

(54) WAVEGUIDES INCORPORATING NOVEL METAMATERIALS AND ASSOCIATED METHODS OF MANUFACTURE

(71) Applicants: Hossein Alisafaee, Charlotte, NC (US); Michael Fiddy, Huntersville, NC (US)

(72) Inventors: Hossein Alisafaee, Charlotte, NC (US); Michael Fiddy, Huntersville, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 477 days.

(21) Appl. No.: 14/466,364

(22) Filed: Aug. 22, 2014

(65) Prior Publication Data
US 2016/0363726 A1    Dec. 15, 2016

Related U.S. Application Data

(60) Provisional application No. 61/868,714, filed on Aug. 22, 2013.

(51) Int. Cl.
*G02B 6/032* (2006.01)
*G02B 6/02* (2006.01)
*G02B 1/00* (2006.01)

(52) U.S. Cl.
CPC ......... *G02B 6/02328* (2013.01); *G02B 1/007* (2013.01)

(58) Field of Classification Search
CPC ..................... G02B 6/02366; G02B 6/02342
See application file for complete search history.

(56) References Cited

U.S. PATENT DOCUMENTS

| | | | |
|---|---|---|---|
| 8,849,080 B1 * | 9/2014 | Manzur ................... | H01S 5/141 359/341.1 |
| 2007/0237478 A1 * | 10/2007 | D'Aguanno ........... | B82Y 20/00 385/129 |
| 2012/0212375 A1 * | 8/2012 | Depree, IV ........ | H01Q 15/0086 343/700 MS |
| 2014/0023321 A1 * | 1/2014 | Lu ........................... | G02B 6/10 385/40 |

FOREIGN PATENT DOCUMENTS

DK    WO 2010127676 A1 *    11/2010    ......... G02B 6/02342

OTHER PUBLICATIONS

Carlo Rizza, Optical Hollow-core waves in nonlinear Epsilon-Near-Zero metamaterials, Universitia dell'Aquila, pp. 1-5.*

* cited by examiner

*Primary Examiner* — Sung Pak
*Assistant Examiner* — Hoang Tran
(74) *Attorney, Agent, or Firm* — Clements Bernard Walker PLLC; Christopher L. Bernard (57) ABSTRACT

A hollow-core waveguide structure for guiding an electromagnetic signal, comprising: a core material comprising a predetermined refractive index; and a cladding structure disposed about the core material, wherein the cladding structure has a refractive index that is less than unity; wherein the cladding structure comprises an Epsilon-near-zero (ENZ) metamaterial. The core material comprises air or the like. The cladding structure comprises one of substantially planar sheets disposed about the core material and a substantially tubular structure disposed about the core material. Optionally, the ENZ metamaterial comprises a plurality of nanostructures disposed in a host medium. The plurality of nanostructures comprise a transparent conducting oxide. Alternatively, the cladding structure is manufactured via a self-assembly method.

18 Claims, 8 Drawing Sheets

WAVEGUIDES INCORPORATING NOVEL METAMATERIALS AND ASSOCIATED METHODS OF MANUFACTURE

CROSS-REFERENCE TO RELATED APPLICATION

The present patent application/patent claims the benefit of priority of U.S. Provisional Patent Application No. 61/868,714, filed on Aug. 22, 2013, and entitled "NOVEL METAMATERIAL WAVEGUIDES," the contents of which are incorporated in full by reference herein.

STATEMENT OF FEDERALLY SPONSORED RESEARCH OR DEVELOPMENT

The U.S. Government may have certain rights in the present disclosure pursuant to Contract No. 1068050 awarded by the National Science Foundation (NSF).

FIELD OF THE DISCLOSURE

The present disclosure relates generally to the optics field. More specifically, the present invention relates to waveguides incorporating novel metamaterials and associated methods of manufacture.

BACKGROUND OF THE DISCLOSURE

Epsilon-near-zero (ENZ), or low-refractive index, metamaterials are an interesting class of structures for novel applications at optical, THz, and microwave frequencies. It is possible to improve previously well-known optical systems utilizing the properties of such artificial materials. Thus, the present disclosure incorporates an ENZ metamaterial into waveguides in order to suppress the usual dispersion associated with the interaction of light with material in the core, guiding layer of the (dielectric) waveguides.

An ideal "material" for the core is air, since it has minimum interaction with light. However, in dielectric waveguides, the core must possess a higher refractive index than the cladding, even though, for example, in telecommunication fibers, the difference is best kept very small to maintain single-mode operation. Thus, ENZ metamaterials can provide a mechanism for such air-core waveguides by the introduction of a cladding medium exhibiting a refractive index that is less than unity.

BRIEF SUMMARY OF THE DISCLOSURE

In various exemplary embodiments, the present disclosure provides novel metamaterial structures designed for use as a refractive index-guiding system for electromagnetic signals in a hollow core configuration. The refractive index-guiding is provided by a low-refractive index cladding, and, for large-refractive index differences and high-moded waveguides, this can be regarded as similar to total internal refraction. ENZ metamaterials are used to provide this mechanism for hollow, air-core waveguides by the introduction of a cladding medium exhibiting a refractive index that is less than unity. The metamaterial structure is designed based on the inclusion of suitable nanostructures in a host medium. It is only recently that these properties and the realization of such metamaterials have become possible. Thus, the present disclosure provides a novel application and other possible new devices and products based on metamaterials with a refractive index that is less than unity. This represents an innovative method for the confinement of electromagnetic waves in air at the nano and micro-scales.

In one exemplary embodiment, the present disclosure provides a hollow-core waveguide structure for guiding an electromagnetic signal, comprising: a core material comprising a predetermined refractive index; and a cladding structure disposed about the core material, wherein the cladding structure has a refractive index that is less than unity; wherein the cladding structure comprises an Epsilon-near-zero (ENZ) metamaterial. The core material comprises air. The predetermined refractive index is equal to or greater than unity. The cladding structure comprises one of substantially planar sheets disposed about the core material and a substantially tubular structure disposed about the core material. Optionally, the ENZ metamaterial comprises a plurality of nanostructures disposed in a host medium. The plurality of nanostructures are disposed in the host medium in one of a matrix and a random pattern. The plurality of nanostructures comprise a transparent conducting oxide. The plurality of nanostructures aluminum zinc oxide (AZO), germanium zinc oxide (GZO), another doped zinc oxide, a doped nitride oxide, or the like. The host medium comprises a binder material. Alternatively, the cladding structure is manufactured via a self-assembly method.

In another exemplary embodiment, the present disclosure provides a method for providing a hollow-core waveguide structure for guiding an electromagnetic signal, comprising: providing a core material comprising a predetermined refractive index; and providing a cladding structure disposed about the core material, wherein the cladding structure has a refractive index that is less than unity; wherein the cladding structure comprises an Epsilon-near-zero (ENZ) metamaterial. The core material comprises air. The predetermined refractive index is equal to or greater than unity. The cladding structure comprises one of substantially planar sheets disposed about the core material and a substantially tubular structure disposed about the core material. Optionally, the ENZ metamaterial comprises a plurality of nanostructures disposed in a host medium. The plurality of nanostructures are disposed in the host medium in one of a matrix and a random pattern. The plurality of nanostructures comprise a transparent conducting oxide. The plurality of nanostructures comprise aluminum zinc oxide (AZO), germanium zinc oxide (GZO), another doped zinc oxide, a doped nitride oxide, or the like. The host medium comprises a binder material. Alternatively, the cladding structure is manufactured via a self-assembly method.

BRIEF DESCRIPTION OF THE DRAWINGS

The present disclosure is illustrated and described herein with reference to the various drawings, in which like reference numbers are used to denote like device components/method steps, as appropriate, and in which.

DETAILED DESCRIPTION OF THE DISCLOSURE

Again, ENZ, or low-refractive index, metamaterials are an interesting class of structures for novel applications at optical, THz, and microwave frequencies. It is possible to improve previously well-known optical systems utilizing the properties of such artificial materials. Thus, the present disclosure incorporates an ENZ metamaterial into waveguides in order to suppress the usual dispersion associated with the interaction of light with material in the core, guiding layer of the (dielectric) waveguides.

An ideal "material" for the core is air, since it has minimum interaction with light. However, in dielectric waveguides, the core must possess a higher refractive index than the cladding, even though, for example, in telecommunication fibers, the difference is best kept very small to maintain single-mode operation. Thus, ENZ metamaterials can provide a mechanism for such air-core waveguides by the introduction of a cladding medium exhibiting a refractive index that is less than unity.

The metamaterial for such an application is constructed by the inclusion of suitable nanostructures in a host medium. The material for these nanostructures is chosen such that it introduces the lowest possible optical attenuation to optical signals. Thus, AZO, a transparent conducting oxide, is chosen as a suitable material for the ENZ waveguides. It will be readily apparent to those of ordinary skill in the art, however, that other comparable materials may also be utilized.

Figure 1:
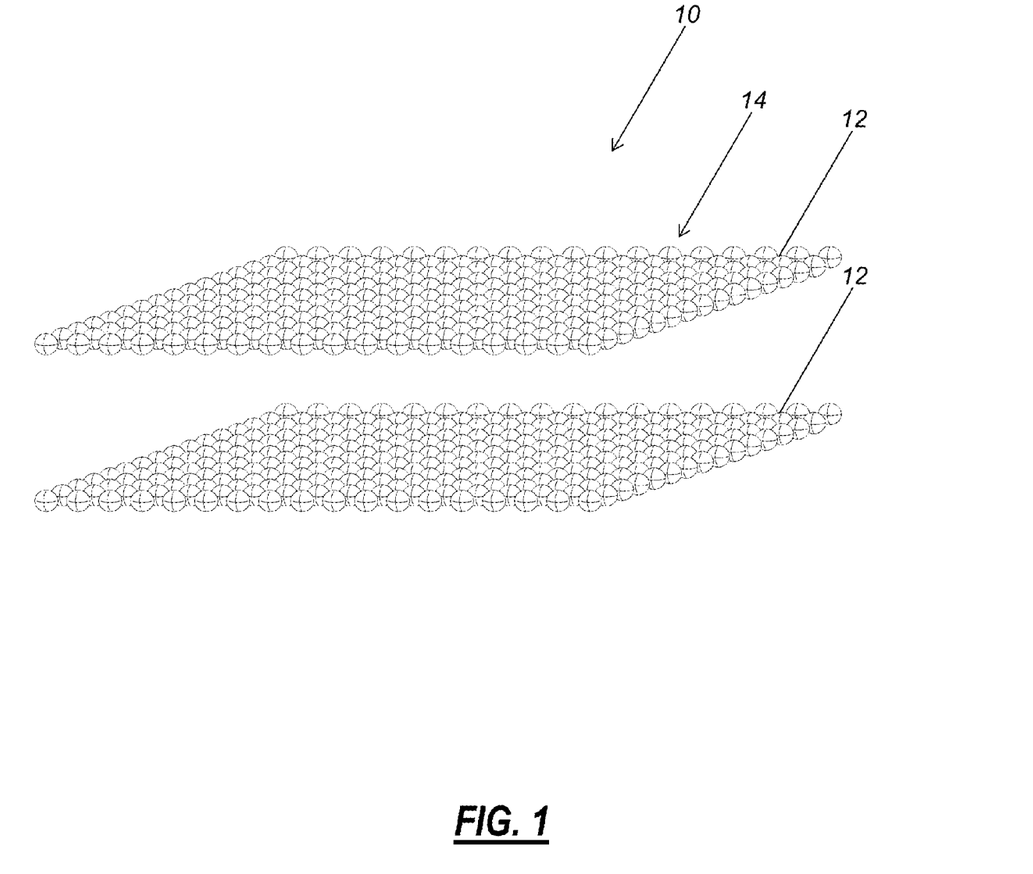
FIG. 1 is a schematic diagram illustrating one exemplary embodiment of a planar waveguide structure incorporating an ENZ metamaterial in accordance with the present invention, the planar waveguide structure providing one-dimensional (1-D) confinement of an electromagnetic signal.
Figure 2:
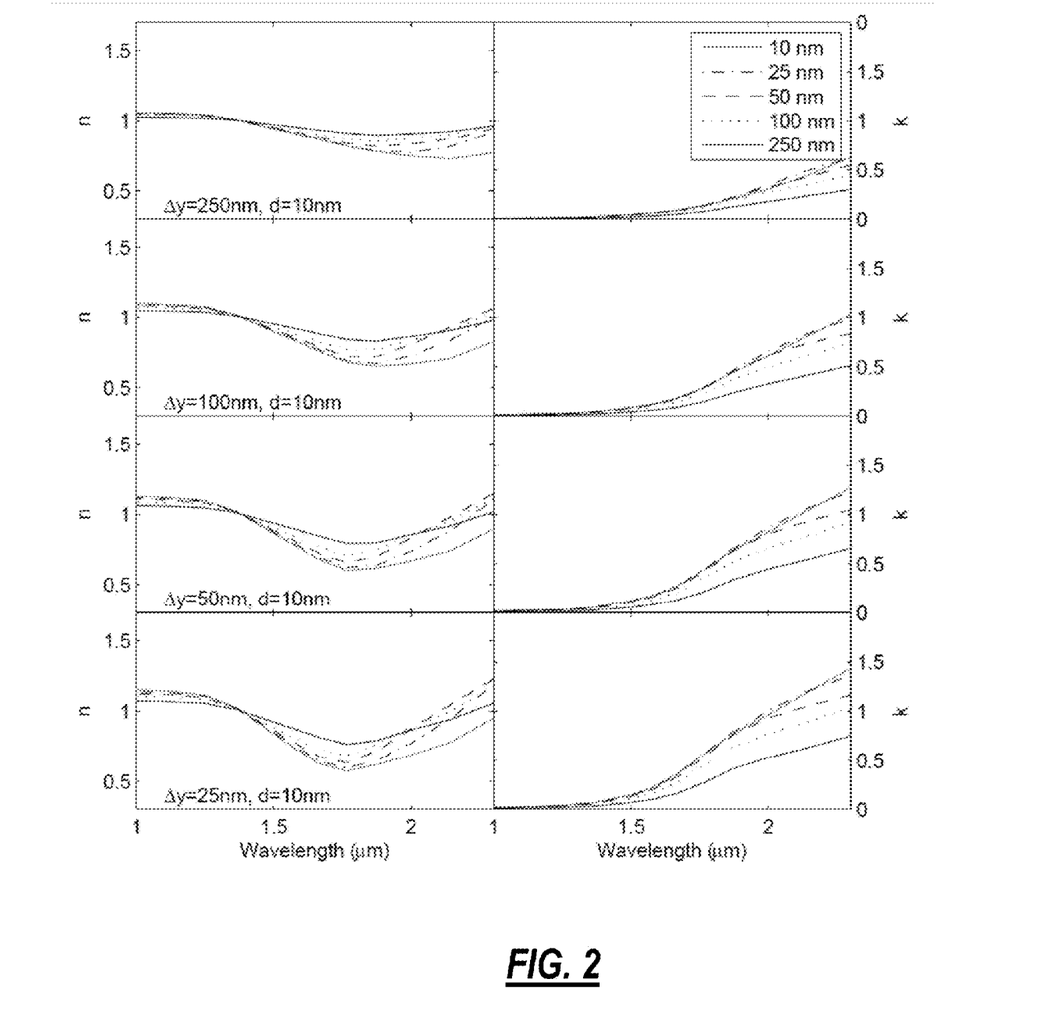
FIG. 2 is a series of plots illustrating exemplary retrieved optical constants for a sheet of aluminum zinc oxide (AZO) nanoparticles depending on separation the in x and y directions.

Referring now specifically to FIG. 1, in one exemplary embodiment, a 1-D planar waveguide 10 is provided that includes two parallel sheets 12 of metamaterial structures 14 that confine the light. If it is assumed that each sheet 12 made of AZO nanospherical particles, for example, the refractive index of the sheet 12 is determined based on the separation in two different directions, x and y, as illustrated in FIG. 2. It is apparent that the refractive index is less than unity in the vicinity of telecommunication wavelengths of about 1.5 microns. Thus, the 1-D planar waveguide 10 can be used as a metamaterial waveguide for electromagnetic waves. The fabrication of such sheets 12 can be done by self-assembly methods through use of ligands to keep the particles together, as is described in greater detail herein below.

Figure 3:
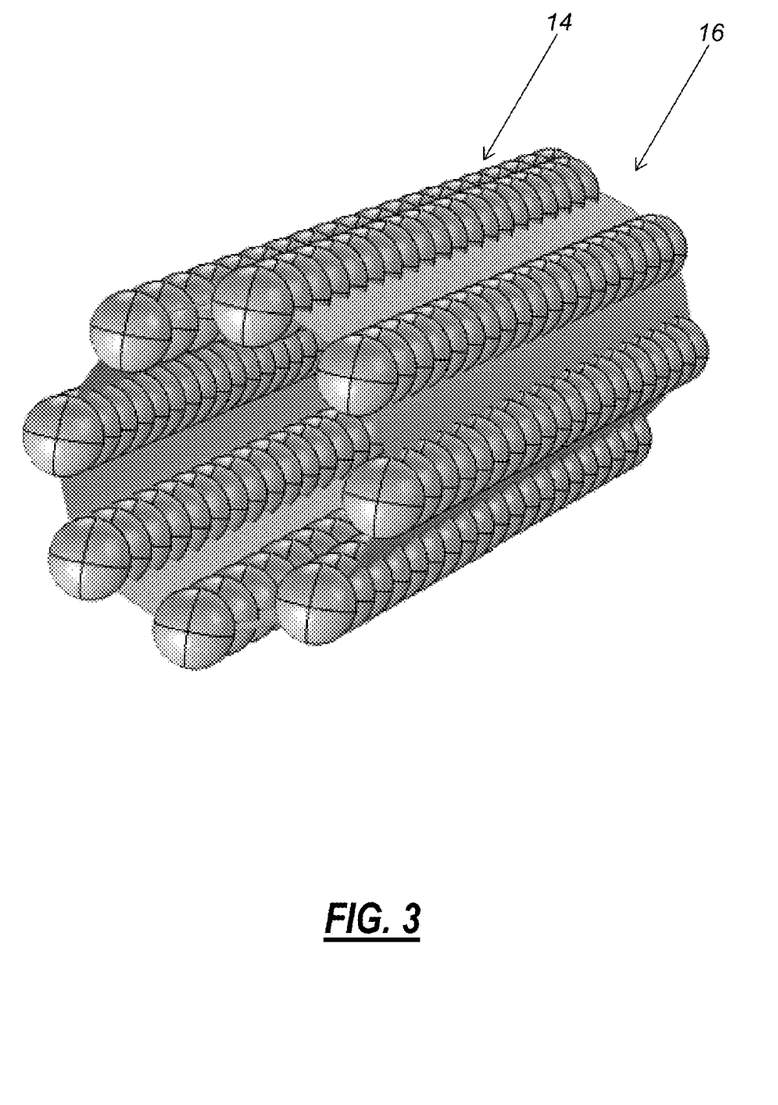
FIG. 3 is a schematic diagram illustrating one exemplary embodiment of a hollow core fiber waveguide structure incorporating an ENZ metamaterial in accordance with the present invention, the hollow core fiber waveguide structure providing two-dimensional (2-D) confinement of an electromagnetic signal.

Referring now specifically to FIG. 3, for a 2-D confinement, it is also possible to wrap the same material 14 into a cylindrical structure 16 to get the geometry of a fiber. It is also possible to grow such metamaterial fibers 16 by the use of self-assembly approaches similar to ones that are introduced for nanorings.

In general, transparent conducting oxides (TCOs) are an interesting class of plasmonic materials, which are under intensive study for their use in low-loss metamaterials and a range of applications, such as sensing, imaging, and transformation optics. Here, using both full-wave simulations and an equivalent circuit model for pairs of nanoparticles of aluminum doped zinc oxide (AZO), the plasmonic effects for low-loss, low-index metamaterials are presented, for infrared applications by way of example. The behavior of localized surface plasmon resonances (LSPRs) of AZO nanoparticle dimers embedded in a host polymer medium is investigated for different dimer orientations with respect to the incident electromagnetic wave(s). The role of dressed-polarizability to enhance and quench the plasmonic effects is also considered. The effects of the nanoparticles relative size and the spacing between them are considered. Understanding these resonances and their dependence on dimer orientations provides a means to design the metamaterial structures for use in the near infrared (NIR) region, for example, with ENZ properties leading also to the low-refractive index metamaterials of interest. Nanospheres with radii less than 100 nm that are distributed with an average spacing less than their diameter can result in an effective medium with a refractive index less than one. A full-wave frequency domain finite element method is used in conjunction with an equivalent-circuit model for the nanoscale dimers in order to describe the spectral response of the bulk low-refractive index properties. A statistical analysis is also presented to obtain the effective refractive index for incident light having different polarizations.

Metamaterials are artificial structures designed and implemented in various regions of the electromagnetic spectrum from microwave to optical frequencies, which constitute an exciting area of research with promising and exotic applications, such as negative index for super and hyper-lenses, invisibility cloaking, giant chirality, etc. A particular class of metamaterials are structures with ENZ, or low-refractive-index properties, which can squeeze electromagnetic waves into ultra-narrow ENZ channels, shaping the phase pattern of radiation sources, controlling leaky wave radiation in ENZ waveguides, etc. At a desired wavelength in the optical or IR range, ENZ metamaterials can be synthesized by embedding suitable inclusions, such as metals, in a host medium.

Metallic particles exhibit LSPRs which are dependent on size, shape, material, and host medium of the particles. At the high frequencies of optical and IR light, the interband electronic transitions of metals cause attenuation for light, which degrades the performance of the plasmonic system for application purposes. A method to compensate for this loss is the use of a gain medium as host material. However, in the case of metals, the losses are large compared to the available gain. Also, for plasmonic applications of metals at IR frequencies, for example, there is a need for host dielectric materials with high permittivity to satisfy the requirement of the resonance condition. Therefore, alternative plasmonic materials, such as transparent conducting oxides, are proposed.

TCOs, such as AZO or gallium zinc oxide (GZO), are an interesting class of plasmonic materials, as opposed to metals, which are under intensive study for their use in low-loss metamaterials and a range of applications, such as sensing, imaging, and transformation optics. Due to their content of free electrons, metallic and TCO nanoparticles can exhibit LSPR, provided that the condition of the resonance is met. It is also demonstrated that the doping of TCOs can be high enough to resemble metal-like optical properties at near IR frequencies, for example. Among TCOs, AZO is a material with low loss at NIR wavelengths. Nanoparticles of AZO are commercially available and usually used in optoelectronics applications such as in solar cell panels. It is possible to use nanospheres of AZO for making a low-loss, low-index metamaterial by embedding them in a suitable host medium via a chemical or physical deposition method or also with self-assembly approaches. To obtain the recipe for fabrication, i.e. the particles size and spacing, one needs to first design and model the response of such structures.

To model the response of conductive nanoparticles, various approaches are available, such as the Discrete Dipole Approximation (DDA) or the Method of Moments (MoM). Also, a very intuitive approach on the design procedure is the use of equivalent electric circuits. Since it has been suggested that such nanoparticles can be used as lumped circuit elements in the optical regime, one can employ the circuit model to find the response of such particles. Another approach for obtaining the response of structures is direct computation of Maxwell's equations by full-wave simulations. Although this method is not suitable for design purposes, it can shed light on the mechanisms and processes involved in obtaining the desired response. There are several commercial software products for this purpose such as COMSOL Multiphysics, Ansoft HFSS, CST Microwave Studio, etc.

It is worth mentioning that, after characterizing the response of one or a few particles, one needs to obtain the properties of the bulk. This can be done with different approaches to retrieve refractive index, permittivity, and permeability of the bulk structure. We use the S-parameter retrieval method, for example. Other methods are homogenization, Bloch Mode analysis, current driven, etc.

Here, we are to design a low-loss, low-index metamaterial structure made of dimers of AZO for IR wavelengths, for example. That is, we consider a metamaterial structure made of coupled nanospheres of AZO. Using the LCR method, we then study the properties of coupled AZO particles upon changes in orientation toward light polarization and also inter-particle spacing. Further, a full-wave approach is used to look into the electromagnetic behavior of the system. Finally, we retrieve the bulk properties of the designed structure and compare them with that of usual effective medium approaches.

In the quasi-static approximation, where the particle size is much smaller than the wavelength of light, it is demonstrated that one can consider the interaction of nanoparticles with light as the response of lumped circuit elements. Depending on the sign of the material's permittivity, the response can be inductive (for negative sign), or capacitive (for positive sign). In both cases, a resistive response can also be considered for the imaginary part of the permittivity. There is then the displacement current that takes the role of electric current in such equivalent circuits, having this unique property that it is no longer confined to conducting wires, but, instead, it flows in the whole space. Except in some specific cases, this results in simultaneous parallel and series configurations, which can open new design approaches, or, on the other hand, can limit the prediction of usual designs.

Figure 4:
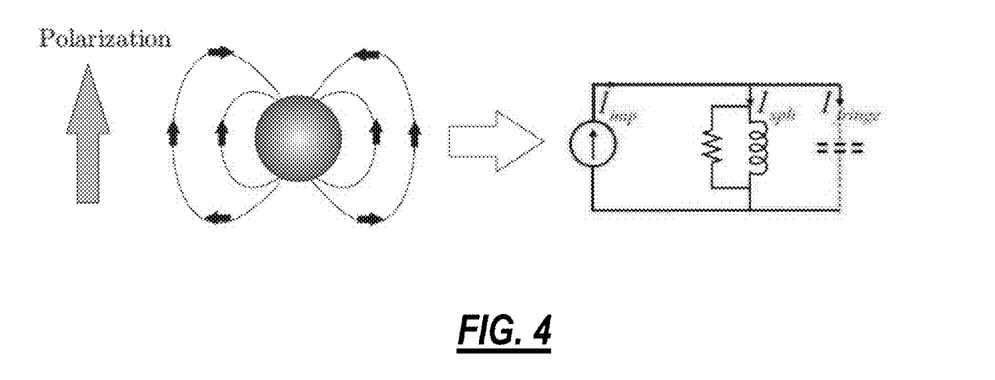
FIG. 4 is a schematic diagram and a circuit diagram illustrating a plasmonic nanosphere with $\epsilon<0$, which is equivalent to a nanoinductor and a nanoresistor, the black arrows are representative of fringe dipolar field, and the grey arrow is the polarization direction of incident light, on the right is the equivalent nanocircuit of this plasmonic particle.

The equivalent circuit of a conductive nanoparticle is shown in FIG. 4. The circuit is basically comprised of an impressed current generator (Eq. 1), nanoparticle impedance (Eq. 2), and a parallel fringe capacitance of impedance (Eq. 3) due to the dipolar field, which are described in association with the particle properties. We can find the equivalent voltage as in Eq. 4. The resonance seems to be independent of particle radius (R), which is not what happens in reality. At resonance, the response can be considered to be independent of particles radius. Corresponding equivalent circuit elements including nanoinductor, nanocapacitor, and nanoresistor can be obtained from Eqs. 5-7.

$$I_{imp} = -i\omega(\epsilon - \epsilon_0)\pi R^2 |E_0| \quad (1)$$

$$Z_{nano} = (-i\omega\epsilon\pi R)^{-1} \quad (2)$$

$$Z_{fringe} = (-i\omega\epsilon_0 2\pi R)^{-1} \quad (3)$$

$$V = \frac{\epsilon - \epsilon_0}{\epsilon + 2\epsilon_0} R |E_0| \quad (4)$$

$$L_{sph} = (-\omega^2 \pi R Re[\epsilon])^{-1} \quad (5)$$

$$C_{sph} = 2\pi R \epsilon_0 \quad (6)$$

$$G_{sph} = \pi \omega R Im[\epsilon] \quad (7)$$

When two nanoparticles are interacting, their overlapping fringe fields change and there will be additional induced dipoles in each particle. The equivalent circuit then needs modification, assuming no higher order resonances are present in the system. Here, we just mention the final results. To include the coupling effect between the particles, one needs to add dependent current sources in the circuit equivalent with a current expression of:

$$I_{12(21),dipolar} = i\omega\pi |E_{12(21)}|(\epsilon_{1(2)} - \epsilon_0)R_{1(2)}^2, \quad (8)$$

This provides the field originated from the second (first) sphere, evaluated at the center of the first (second) sphere. They are defined as:

$$\begin{pmatrix} E_{12} \\ E_{21} \end{pmatrix} = \begin{pmatrix} |d|^3 \bar{I} & -\gamma_2(3\bar{D} - \bar{I}) \\ \gamma_1(3\bar{D} - \bar{I}) & |d|^3 \bar{I} \end{pmatrix}^{-1} \begin{pmatrix} \gamma_2(3\bar{D} - \bar{I})E_0 \\ -\gamma_1(3\bar{D} - \bar{I})E_0 \end{pmatrix}, \quad (9)$$

-continued $$\ddot{D} = \frac{d}{|d|}\frac{d}{|d|}, \bar{I} = \begin{pmatrix} 1 & 0 & 0 \\ 0 & 1 & 0 \\ 0 & 0 & 1 \end{pmatrix}, \gamma_1 = \frac{\epsilon_i - \epsilon_0}{\epsilon_i + 2\epsilon_0}R_i^3. \quad (10)$$

Figure 5:
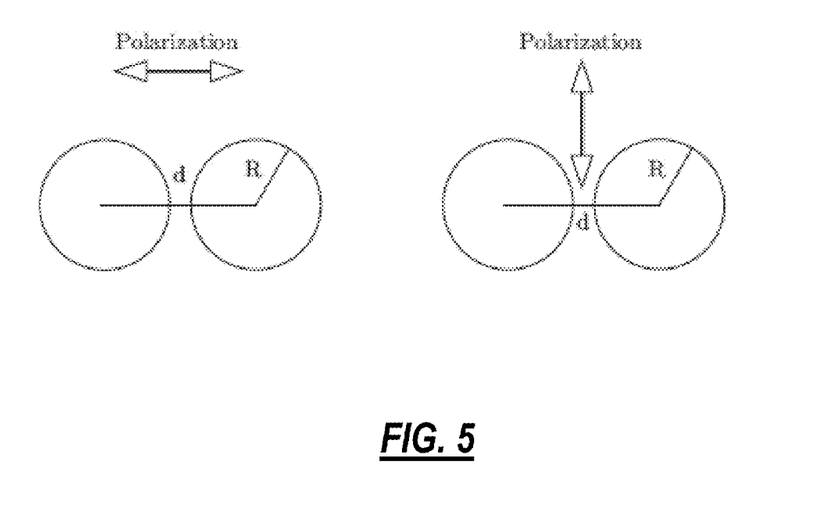
FIG. 5 is a schematic diagram illustrating a dimer system made of two spherical nanoparticles with center-to-center separation of 2R+d, where the orientation of the dimer axis to the polarization of light is parallel (left) and perpendicular (right)

This equation is completely general for any arbitrary orientation. There are, however, two simplified cases as shown in FIG. 5; 1) the axis of dimer is parallel to the polarization direction of the incident light (Eq. 11) and 2) the axis is perpendicular to the polarization (Eq. 12).

$$E_{12} = \frac{2\gamma_2(d^3 + 2\gamma_1)}{d^6 - 4\gamma_1\gamma_2}E_0 \quad (11)$$
$$E_{21} = \frac{2\gamma_1(d^3 + 2\gamma_2)}{d^6 - 4\gamma_1\gamma_2}E_0$$

$$E_{12} = \frac{2\gamma_2(\gamma_1 - d^3)}{d^6 - \gamma_1\gamma_2}E_0 \quad (12)$$
$$E_{21} = \frac{2\gamma_1(\gamma_2 - d^3)}{d^6 - \gamma_1\gamma_2}E_0$$

In the next section, we begin the analysis of particles' interaction and coupling in the dimer structure by evaluating the last two equations.

As mentioned above, the induced dipoles on each sphere are dependent on the field passing through it. The coupling between the particles is dependent on the separation, radius, and parameter which includes the permittivity values of the particle and the host medium. We studied the two cases of parallel and perpendicular orientation of the dimer axis by evaluation of their corresponding secondary fields, which are related to the voltage controlled dependent source (Eq. 9). The nanoparticles are considered with a spherical shape and identical radii in each dimer. Their material is assumed to be AZO. The host medium is air.

Since the frequency dependence of the material's permittivity is not included in Eq. 9, it is necessary to study these changes directly. Moreover, due to the variation of the material's loss over the frequency range, different cases of loss are also considered in the calculations. We study the effects of dimer separation on the secondary fields. The maximum separation is assumed to be as large as a radius of the particle, and the minimum separation is zero. The results of our study are shown in FIG. 6.

Having analyzed the behavior of contours shown in FIG. 6, important aspects of the results can be found as follows. FIG. 6 (left) shows the values for parallel orientation, and FIG. 6 (right) shows the same parameter for perpendicular dimer orientation. The resonances in each orientation have different magnitudes and also different occurrence along the vertical axis which is the real part of the permittivity. That is, the parallel dimer has a pronounced resonance compared to the perpendicular case, which, in general, is more than one order of magnitude. However, it can be observed that for the case of perpendicular orientation, the resonance band is extended to be almost constant over a wide range of separations, while the resonance seems more localized at smaller separation values for the parallel case. But, it should be noted that the resonance magnitude for the parallel case is larger than the case of perpendicular one even when dimer separation is very large. Another point to be made is the location of the resonance in the parallel case, which happens at values smaller than those of perpendicular case. We need to recall that the resonance for a lossless material occurs. These changes in the location of the resonances can be translated to red-shift and blue-shift of LSPR due to coupling in parallel and perpendicular cases, respectively. The last result from the plots in FIG. 6 can be thought of as the obvious broadening in the resonance with increase of the losses. It is also observable that as the losses are higher, the peak value of the resonance degrades severely, hence the Q-factor of the dimer structure decreases significantly.

These studies, which are based on classical electrodynamics, show an enhanced field localization as the separation approaches to zero. However, we need to point out that there are other studies based on quantum approaches demonstrating different results when the separation is close to zero. We have neglected the latter type of study because the proximity we are going to study in this work is larger than the limits of the mentioned quantum approach.

Figure 6:
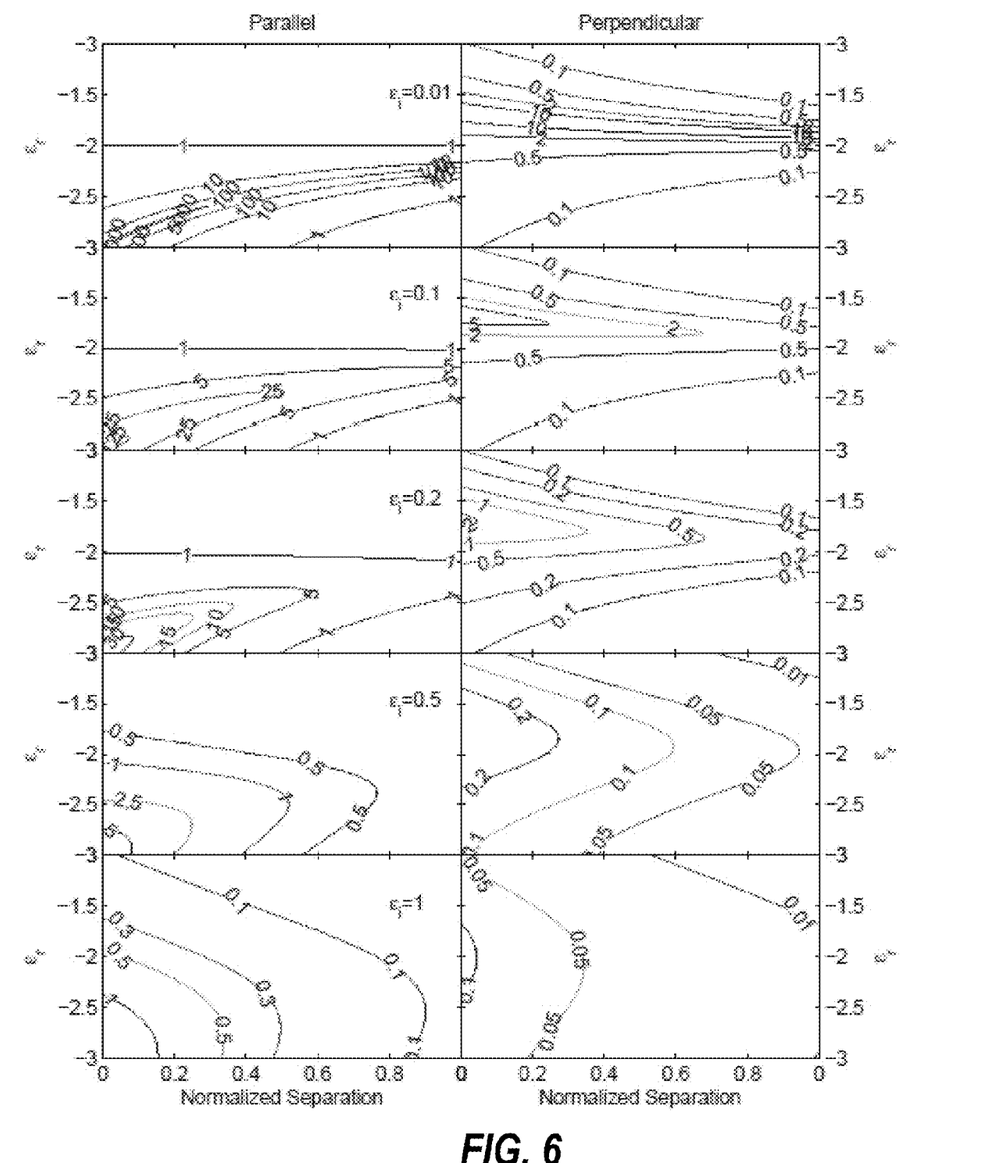
FIG. 6 is contour plots of parallel (left column) and perpendicular (right column) orientations of dimers, calculated as the distance between two spheres is changing from 0, the touching limit, to 1, in units of R, the vertical axis accounts for changes of real part of permittivity due to spectral response of nanoparticles, and each row from top to bottom adds to the loss term, represented by the imaginary part of permittivity.
Figure 7:
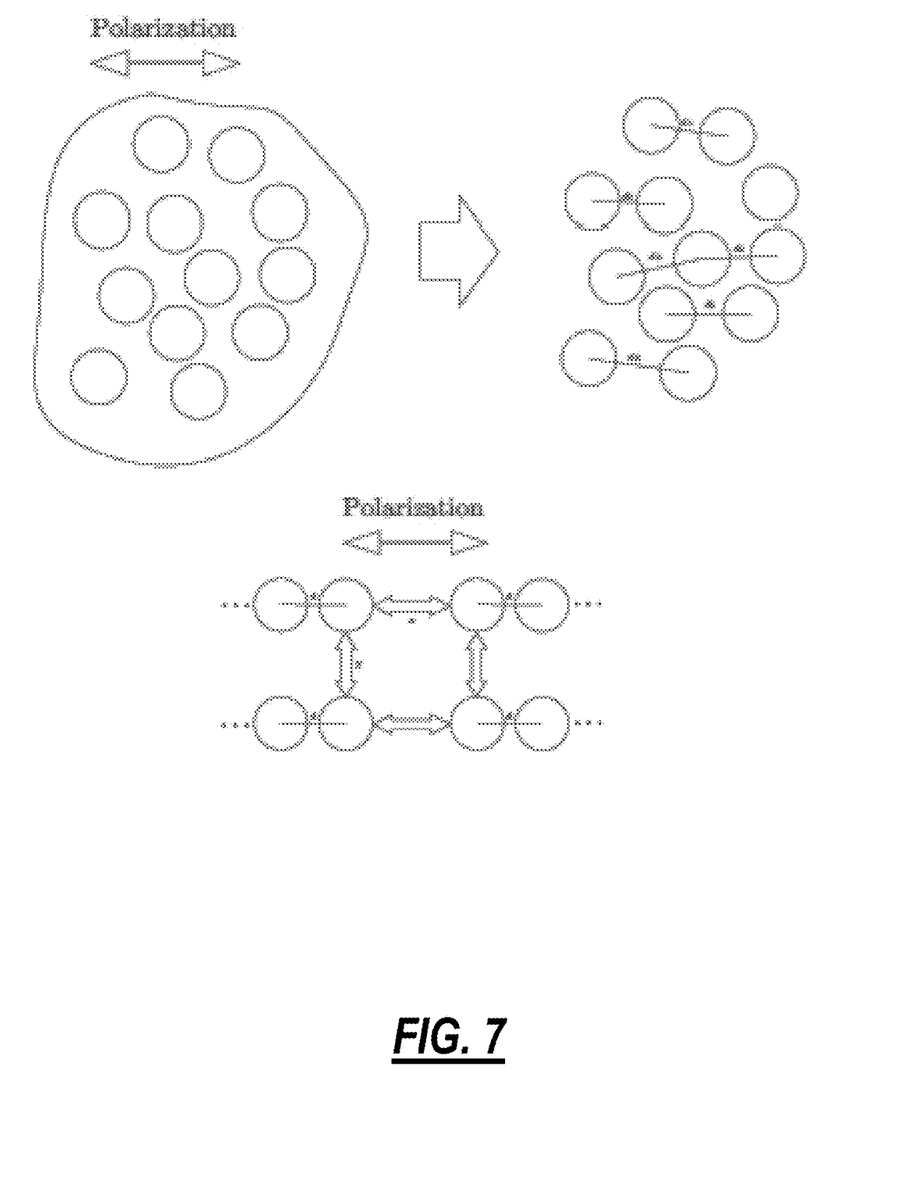
FIG. 7 is a schematic diagram illustrating the decomposition of a random placement of nanoparticles into dimers with parallel axis to the polarization of light, the dimers have various separations due to randomness of the structure, and, at the bottom, the randomly positioned dimers are arranged into an ordered array structure for ease of computations.

Comparing the magnitude of parallel and perpendicular resonances in FIG. 6 implies that we can safely neglect the perpendicular orientation coupling and only consider the parallel one for further calculation of bulk properties. This occurs because of the role of dressed polarizability, which is defined as the ratio between the enhanced dipole moment and the incident field. That is, for the parallel orientation, we have an enhanced dipolar response, while for perpendicular orientation the dipolar response is quenched. Thus, we can assume a bulk structure composed of dimers with axis parallel to the polarization of light. That is we are now enabled to decompose a structure made from random embedding of nanospheres into a dimer based structure for computation of its bulk properties. This is because we can consider every two nanospheres with a separation less than their diameter as a dimer parallel to the light's linear polarization, which is schematically illustrated in FIG. 7.

Figure 8:
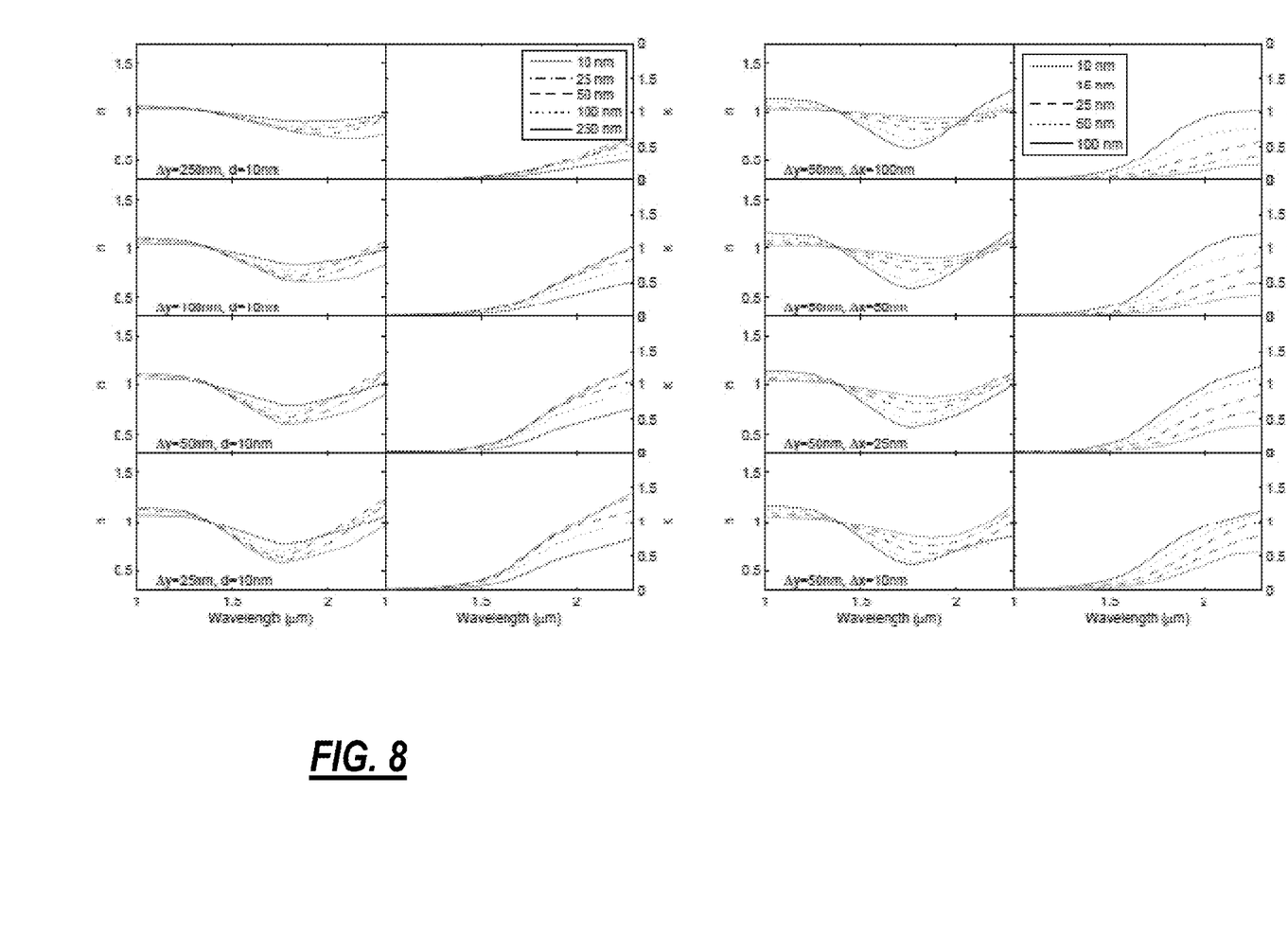
FIG. 8 are (left) plots of optical constants retrieved for array of dimers with fixed separation (d=10 nm) but variable inter-dimer distance in x and y directions, the radius of all nanospheres is R=50 nm, and (right) retrieved n and k for dimers with different radius and fixed separation.
Figure 9:
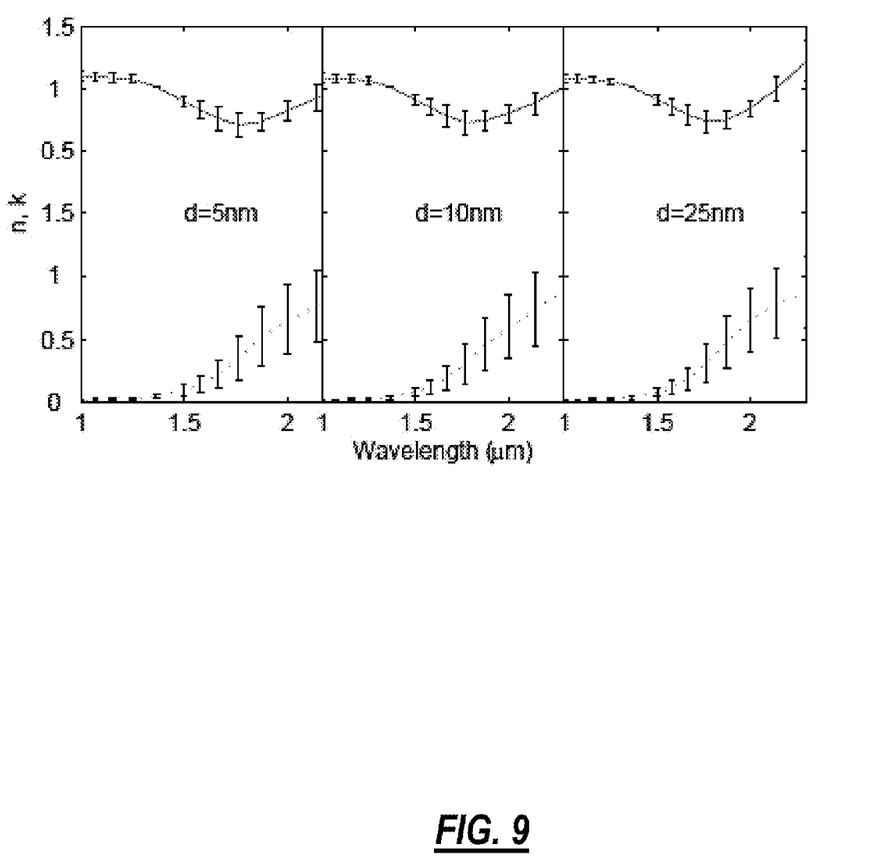
FIG. 9 is retrieved optical constants for the dimer arrays having three different separations, 5 nm, 10 nm, and 25 nm, each plot is obtained by averaging optical constants retrieved from an array of dimers with varying separation between its dimers in x and y directions.

To calculate of bulk properties, we need to consider arrays of such dimers and take into account the inter-particle coupling. However, since the adjacent spacings between dimers are again somewhat random, it is then necessary to study each case separately and then take the average of all the individual arrangements. FIG. 8 (left panel) shows the main framework to study different arrangements with a fixed radius of 50 nm for AZO nanospheres. It can be seen that as the lateral separation in the y direction ($\Delta y$) decreases, there is a blueshift in the response of the metamaterial structure. This is consistent with the results of LCR approach. Moreover, since we need to examine the effect of dispersion in radius on the bulk optical constants, a similar study of arrays but with different radii has been carried out, with the results shown in the right panel of FIG. 8. Furthermore, we considered three different dimer separations (d) of 5 nm, 10 nm, and 25 nm to take into consideration most of the randomness in the final fabricated metamaterial layer. For each case, the lateral spacing in x and y directions, $\Delta x$ and $\Delta y$, respectively, are variables in the range of 10 nm to 250 nm. The resulting plots (FIG. 9) are representative averaged optical constants for a random structure made from dimers having certain separations.

Regarding simple effective medium theories (EMT) to calculate the permittivity of bulk structure, it is possible to use the Bruggeman mixing rule for getting an idea of what could be predicted. The main factor in determining the effective permittivity of such metamaterial structures is the filling factor (f). In our study, the maximum filling factor is about ½ for $\Delta x=0$, $\Delta y=0$. If we use the Bruggeman mixing rule:

$$\epsilon = \frac{1}{4}\left\{(3f_1-1)\epsilon + (3f_2-1)\epsilon_0 \pm \sqrt{[(3f_1-1)\epsilon + (3f_2-1)\epsilon_0]^2 + 8\epsilon\epsilon_0}\right\} \quad (13)$$

with $f_1=f_2=\frac{1}{2}$, which is the maximum packing density, then the lowest "'effective'" refractive index would be n≈0.8, k≈0.65 @ 2 μm. If we define the figure of merit (FOM) for low-index metamaterials as 1/nk, we find FOM=1.9 from Bruggeman EMT. However, as we have seen from rigorous full-wave simulations, the optical constants of the dimer structure can provide much better FOM such as a value of 4 for the case with Δx=25 nm, Δy=25 nm. This not only is more than twice the value predicted from EMT, but also the occurrence of the lowest index wavelength is blueshifted. The reason behind such a difference could be the plasmonic effects that are ignored in the Bruggeman formula. This means that the approach we used for achieving the spectral response of such low-index metamaterial structures is more accurate compared to conventional methods.

For fabrication of such metamaterial structures, we are using self-assembly approaches in which nanoparticles of AZO are coated with several types of organic ligands: oleic acid, hexadecylamine (HDA), dodecanethiol (DDT), and octadecylamine (ODA). The —SH, —NH2, and COOH functional groups of these ligands are expected to adsorb onto the surface of the AZO nanoparticles. The ligands surrounding the nanoparticles would allow for the adequate spacing between nanoparticles which would create the desired scattering phenomenon.

Thus, we have studied a low-loss low-index metamaterial structure comprised of dimers of AZO for use at near wavelengths, by way of example only. The effects of dimer separation, radius, and dimer arrangement are studied with the help of equivalent circuit theory and also fullwave simulations. We obtained an average low-index band with accept-able values of figure of merit, defined in the paper. We demonstrated that the localized plasmonic effects of AZO nanoparticles have important effects on determining and distinguishing the effective bulk optical constants compared to conventional averaging methods.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A hollow-core waveguide structure for guiding an electromagnetic signal, comprising:
   a core material comprising a predetermined refractive index; and
   a cladding structure disposed about the core material, wherein the cladding structure has a refractive index that is less than unity;
   wherein the cladding structure comprises an Epsilon-near-zero (ENZ) metamaterial.

2. The hollow-core waveguide structure of claim 1, wherein the core material comprises air.

3. The hollow-core waveguide structure of claim 1, wherein the predetermined refractive index is equal to or greater than unity.

4. The hollow-core waveguide structure of claim 1, wherein the cladding structure comprises one of substantially planar sheets disposed about the core material and a substantially tubular structure disposed about the core material.

5. The hollow-core waveguide structure of claim 1, wherein the plurality of TCO nanostructures are coated with an organic ligand that forms at least a portion of the host medium.

6. The hollow-core waveguide structure of claim 1, wherein the plurality of TCO nanostructures are disposed in the host medium in one of a matrix and a random pattern.

7. The hollow-core waveguide structure of claim 1, wherein the plurality of TCO nanostructures comprise aluminum zinc oxide (AZO), germanium zinc oxide (GZO), another doped zinc oxide, or a doped nitride oxide.

8. The hollow-core waveguide structure of claim 1, wherein the host medium comprises a binder material.

9. The hollow-core waveguide structure of claim 1, wherein the cladding structure is manufactured via a self-assembly method.

10. A method for providing a hollow-core waveguide structure for guiding an electromagnetic signal, comprising:
    providing a core material comprising a predetermined refractive index; and
    providing a cladding structure disposed about the core material, wherein the cladding structure has a refractive index that is less than unity;
    wherein the cladding structure comprises an Epsilon-near-zero (ENZ) metamaterial providing a predetermined plasmonic response and wherein the ENZ metamaterial comprises a plurality of transparent conducting oxide (TCO) nanostructures disposed in a host medium with an average spacing less than an average diameter of the plurality of TCO nanostructures.

11. The method for providing the hollow-core waveguide structure of claim 10, wherein the core material comprises air.

12. The method for providing the hollow-core waveguide structure of claim 10, wherein the predetermined refractive index is equal to or greater than unity.

13. The method for providing the hollow-core waveguide structure of claim 10, wherein the cladding structure comprises one of substantially planar sheets disposed about the core material and a substantially tubular structure disposed about the core material.

14. The method for providing the hollow-core waveguide structure of claim 10, wherein the plurality of TCO nanostructures are coated with an organic ligand that forms at least a portion of the host medium.

15. The method for providing the hollow-core waveguide structure of claim 10, wherein the plurality of TCO nanostructures are disposed in the host medium in one of a matrix and a random pattern.

16. The method for providing the hollow-core waveguide structure of claim 10, wherein the plurality of TCO nanostructures comprise aluminum zinc oxide (AZO), germanium zinc oxide (GZO), another doped zinc oxide, or a doped nitride oxide.

17. The method for providing the hollow-core waveguide structure of claim 10, wherein the host medium comprises a binder material.

18. The method for providing the hollow-core waveguide structure of claim 10, wherein the cladding structure is manufactured via a self-assembly method.

* * * * *